United States Patent

Racki

[15] 3,653,406

[45] Apr. 4, 1972

[54] BRAKE CYLINDER PRESSURE RETAINING VALVE

[72] Inventor: Francis R. Racki, Pittsburgh, Pa.

[73] Assignee: Westinghouse Air Brake Company, Wilmerding, Pa.

[22] Filed: Mar. 20, 1970

[21] Appl. No.: 21,429

[52] U.S. Cl.................137/599.2, 137/625.3, 137/625.32, 251/183, 251/185, 251/297, 251/363, 303/79
[51] Int. Cl..............................................F16k 3/22
[58] Field of Search...............137/599.2; 251/181, 183, 185; 303/75, 76, 77, 78, 79

[56] References Cited

UNITED STATES PATENTS

| | | | |
|---|---|---|---|
| 2,685,427 | 8/1954 | Bugg | 251/181 |
| 3,516,638 | 6/1970 | Piggott | 251/185 X |
| 1,546,477 | 7/1925 | Dean | 303/79 |
| 2,204,796 | 6/1940 | Farmer | 303/79 |
| 2,257,886 | 10/1941 | Mueller | 137/599.2 |
| 3,406,943 | 10/1968 | Newell | 251/183 X |

FOREIGN PATENTS OR APPLICATIONS

| | | | |
|---|---|---|---|
| 1,930,733 | 1/1970 | Germany | 251/185 |
| 646,516 | 11/1950 | Great Britain | 251/185 |

Primary Examiner—Robert G. Nilson
Attorney—Ralph W. McIntire, Jr.

[57] ABSTRACT

This invention relates to a three-position sealed ball-type brake cylinder pressure retaining valve device, for connection to the exhaust passageway of a railway car brake control valve device, having a body provided with a securing flange that has a port therein connecting the external face of the flange to a chamber in the body in which chamber a ball-type valve element is rotatably mounted by a handle movable in a plane parallel to the flange selectively to any one of its three positions. The ball-type valve element has a stepped bottomed bore extending inward from its spherical surface, in which bore is a spring-biased check valve. A leaf-type spring interposed between the ball-type valve element and the interior wall surface of the chamber in the body biases this valve element into tight seating contact with a resilient annular exhaust valve seat carried by a removable annular plug disposed in a bore connecting the chamber in the body to the exterior thereof. The ball-type valve element has therein a plurality of angularly spaced passageways and orifices opening at one end at its spherical surface and at the other end either into another passageway also opening at one end at this spherical surface or into the stepped bottom bore. These passageways and orifices, in cooperation with one another and with the check valve, are effective in three respective positions of the ball valve element to selectively provide a fast blow-down of brake cylinder pressure to atmosphere, a slow blow-down to a chosen pressure above atmospheric pressure, and a slow blow-down to atmosphere.

9 Claims, 5 Drawing Figures

Patented April 4, 1972
3,653,406
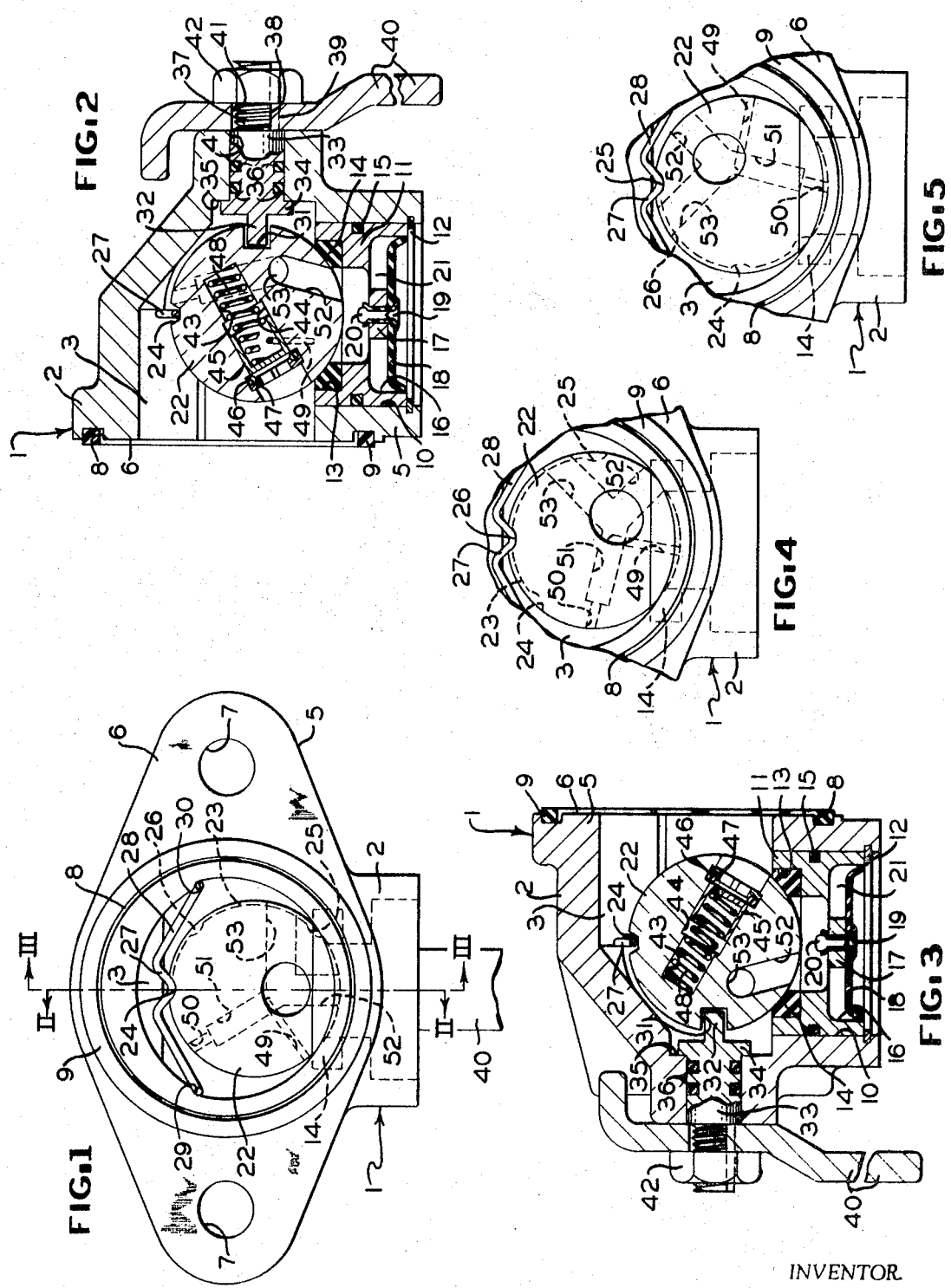
INVENTOR.
FRANCIS R. RACKI
BY Ralph W. McIntire, Jr.
ATTORNEY

BRAKE CYLINDER PRESSURE RETAINING VALVE

Background OF THE INVENTION

In U.S. Pat. No. 3,532,116 issued Oct. 6, 1970 to Daniel G. Scott et al., there is shown and described a tamper-proof brake cylinder pressure retaining valve device having a tapered rotatable plug valve element with a check valve carried interiorly thereof, the valve element being biased to seated relation against the metallic wall surface of a correspondingly tapered bore provided in the body of the retaining valve device. Subsequent to prolonged use, leakage sometimes occurs between the valve element and the wall surface of the tapered bore. Such leakage can be eliminated only by a lapping operation which comprises placing a lapping or abrasive compound on the valve element and thereafter rotating it in contact with or against the wall surface of the tapered bore until the cutting or abrasive action of the lapping compound has cut away enough metal on both the surface of the valve element and the wall surface of the tapered bore to produce corresponding smooth surfaces which, when one is pressed against the other with a chosen force, will prevent the flow of fluid under pressure therebetween. It is apparent that this lapping operation is time consuming and therefore, increases the maintenance cost of brake cylinder pressure retaining valve devices.

Accordingly, it is the general purpose of this invention to provide an improved, novel, compact, tamper-proof three-position brake cylinder pressure retaining valve device that comprises a ball-type valve element biased against an inexpensive replaceable and disposable resilient valve seat to form a seal therewith.

SUMMARY OF THE INVENTION

According to the present invention, a novel, tamper-proof three-position brake cylinder pressure retaining valve device is provided comprising a valve body that has a chamber in which a removable ball-type valve element is biased against an inexpensive, replaceable and resilient annular exhaust valve seat removably carried in the valve body and rotatably with respect thereto by a handle secured to one end of an operating stem the opposite end of which has a tongue-and-groove type connection with the valve element. The ball-type valve element has therein a longitudinal stepped, bottomed bore in the larger end of which a check valve unit is removably mounted. A leaf-type spring has its ends abutting the wall surface of the valve chamber and its center disposed in one or another of three detents formed in the spherical surface of the ball-type valve element so that this spring is effective to bias the valve element into seated relation with the resilient valve seat in any one of three positions to which the valve element may be rotated by the handle. The ball-type valve element is provided with a plurality of angularly spaced passageways so arranged that one end of each opens at the spherical surface of the valve element in such a position as to be disposed within the annular exhaust valve seat in one of the three positions to which the valve element may be moved by the handle. The opposite end of these passageways open respectively into the longitudinal stepped bottomed bore and into another passageway. The size of certain of these passageways is so selected that they constitute orifices so that in the three different positions of the ball-type valve element communication is variously provided between an inlet port formed in a mounting flange integral with the valve body and opening into the chamber therein and an outlet port provided by the annular exhaust valve seat so as to selectively provide a fast blow-down of brake cylinder pressure to atmospheric pressure, a slow blow-down of brake cylinder pressure past the check valve to a chosen pressure above atmospheric pressure corresponding to the loading bias on the check valve, and a slow direct blow-down of brake cylinder pressure to atmospheric pressure.

In the accompanying drawings:

FIG. 1 is an elevational view looking in the direction of the pipe bracket face of a three-position brake cylinder pressure retaining valve device constructed in accordance with the invention.

FIG. 2 is a cross-sectional view, taken along the line 2—2 of FIG. 1 and looking in the direction of the arrows, showing certain structural details of this valve device.

FIG. 3 is a cross-sectional view, taken along the line 3—3 of FIG. 1 and looking in the direction of the arrows, showing further structural details not made apparent in FIG. 2.

FIG. 4 is a partial elevational view of the three-position brake cylinder pressure retaining valve device of FIG. 1 with the spherical valve element shown in the second of its three positions in which a chosen pressure is retained in a brake cylinder device.

FIG. 5 is a partial elevational view of the three-position brake cylinder pressure retaining valve device of FIG. 1 with the spherical valve element shown in the third of its three positions in which a restricted communication is established between a brake cylinder device and atmosphere.

As shown in FIGS. 1 to 5, inclusive, a three-position brake cylinder pressure retaining valve device 1 comprises a casing 2 having therein a chamber 3 which, as shown in FIG. 2, has opening into its right-hand end a bore 4 extending through the casing 2.

As is apparent from FIGS. 2 and 3, formed integral with the casing 2 is a flange 5 having a flanged fitting face 6 (FIGS. 1 to 5, inclusive) that abuts a corresponding face formed on a pipe bracket (not shown) that is secured to the body of a railway car by any suitable means. This pipe bracket has connected thereto one end of a brake cylinder exhaust pipe (not shown) that has its opposite end connected to the exhaust port of the usual fluid pressure operated brake control valve device (not shown) which is provided on each car in a train. As shown in FIG. 1, the flange 5 is provided with two spaced-apart smooth bores 7 for receiving cap screws (not shown) to secure the flange 5 to the pipe bracket.

The above-mentioned one end of the brake cylinder exhaust pipe is disposed in a bore (not shown) in the pipe bracket which bore is coaxial with an annular groove 8 formed in the flange fitting face 6 of the flange 5. A resilient gasket ring 9 is disposed in the annular groove 8 and forms a seal between the flange fitting face 6 on the flange 5 and the abutting corresponding face formed on the pipe bracket when the retaining valve device 1 is secured to this pipe bracket by the above-mentioned cap screws that secure this valve device 1 to the pipe bracket.

As best shown in FIGS. 2 and 3, the casing 2 is provided with a bore 10 that at one end opens into the chamber 3 and at the opposite end to the exterior of the casing. An annular exhaust valve member 11 is disposed in the bore 10 and retained in place by a snap ring 12 that is inserted in a groove formed in the wall surface of this bore 10.

The upper end of the exhaust valve member 11 is provided with a counterbore 13 in which is disposed a removable and disposable annular valve seat 14, which may be constructed of any suitable resilient material such as, for example, rubber. The peripheral surface of the valve member 11 has formed therein a peripheral annular groove in which is disposed an O-ring seal 15 that forms a seal with the wall surface of the bore 10 to prevent leakage of fluid under pressure from the chamber 3 to atmosphere.

The annular exhaust valve member 11 is provided with a cylindrical inner surface 16 from which extends a finger 17 that is integral with the member 11. Resting against this cylindrical inner surface 16 is a dished circular shield 18 which is preferably formed of a resilient material such as rubber. This shield 18 is held in place by any suitable means such as, for example, a pop rivet which comprises a metallic sleeve 19 that extends through coaxial bores in the shield 18 and finger 17, and a stem 20 having at its upper end a ball-like head. When a pull is exerted on the stem 20 by means of a mandrel (not shown), the ball-like head on the upper end of the stem acts to flare outward the upper end of the sleeve 19 until this ball-like head becomes encased therein, as shown in FIGS. 2 and 3, it being understood that the lower end of the sleeve 19 is concurrently flared outward by the mandrel until the opposite ends of the sleeve 19 are flared as shown in FIGS. 2 and 3. Subsequent to the flaring of the opposite ends of the sleeve 19 in the manner just explained, the continued pull on the stem 20 by the mandrel causes this stem to break just below the ball-like head which thereafter maintains the sleeve 19 in the position shown in FIGS. 2 and 3. The circumferential surface of the shield 18 is adapted to engage the cylindrical inner surface 16 for preventing access to an exhaust chamber 21 of particles of foreign matter or by nest-building insects, such as, for example, mud wasps. It will be noted that the surface 16 extends somewhat beyond the rubber shield 18 so as to provide an adequate protection against the formation of ice over the cylindrical cavity in the lower end of the exhaust valve member 11, and that the shield 18 has sufficient area and flexibility to insure its displacement under the pressure of fluid released from the brake cylinder device to eject any foreign matter that might reach it.

As shown in FIGS. 1 to 5 inclusive, a spherical or ball-type valve element 22 is disposed in the chamber 3. As best shown in FIG. 1, the spherical surface of the ball-type valve element 22 is provided with a groove 23 that extends through an angle of approximately 135°, there being detents 24 and 25 provided at the opposite ends of this groove and a third detent 26 provided intermediate its ends. These detents cooperate with a V-shaped bend 27 formed midway the ends of a leaf-type spring 28 to define three positions of the valve element 22 relative to the annular exhaust valve seat 14 against which this valve element is biased by this leaf-type spring the opposite ends of which respectively rest against shoulders 29 and 30 formed on the interior wall surface of the chamber 3 in the casing 2.

As shown in FIG. 2, the right-hand side of the ball-type valve elements 22 is provided with a rectangular groove 31 in which is received a tongue 32 that is integral with an operating stem 33 extending through the bore 4 in the casing 2 to the exterior thereof. On the right-hand side of the tongue 32, as viewed in FIG. 2, the operating stem 33 is provided with a collar 34 that rotatably abuts the right-hand end of a counterbore 35 that is coaxial with the bore 4, and with two spaced-apart peripheral annular grooves in each of which is disposed an O-ring seal 36 that forms a seal with the wall surface of the bore 4 to prevent leakage of fluid under pressure from the chamber 3 to atmosphere along the operating stem 33.

The right-hand end of the stem 33, as viewed in FIG. 2, is provided with a screw-threaded shank 37 in which is formed, as by a milling operation, a slot or groove 38 in which is received a tongue 39 that is integral with a handle 40. The shank 37 extends through an opening 41 formed in the handle 40 which is retained on this shank by a nut 42 that has screw-threaded engagement with the screw threads on this shank.

As shown in FIGS. 2 and 3, the ball-type valve element 22 is provided with a bottomed bore 43 and a coaxial counterbore 44.

Slidably mounted in the counterbore 44 is a cup-shaped check valve 45 which is normally biased against an O-ring 46. This O-ring 46 is carried by a stepped snap ring 47 which is inserted in a groove formed in the wall surface of the counterbore 44. A spring 48 interposed between the check valve 45 and the end of the bottomed bore 43 biases this check valve against the O-ring 46 which constitutes an annular valve seat therefor.

While the spring 48 biases the check valve 45 against its seat 46, communication is closed between the left-hand end, as viewed in FIG. 2, of the counterbore 44 and a drilled passageway or port 49 of small diameter constituting a choke provided in the ball-type valve element 22. One end of this passageway 49 opens into the counterbore 44 and the opposite end opens at the spherical surface of the valve element 22 at such a location as to be disposed within the annular valve seat 14 while the valve element 22 occupies its high pressure position shown in FIG. 4. This passageway 49 shown by dotted lines in FIGS. 1, 2, 4 and 5.

In order to provide for a slow direct complete blow-down of fluid under pressure from the brake cylinder device, while the handle 40 is in its slow direct position, the ball-type valve element 22 is provided with a bore 50 of small diameter so that this bore constitutes a choke, and a coaxial counterbore 51 the axis of which intersects the intersection of the axes of two intersecting passageways or ports 52 and 53 provided in the valve element 22. It will be noted that the axes of these passageways 52 and 53 form a right angle and that one end of each of these passageways opens at the spherical surface of the ball-type valve element 22.

Assuming that the handle 40 of the brake cylinder pressure retaining valve device 1 is disposed in its first or direct exhaust position in which it is shown in FIGS. 1, 2 and 3, it will be understood that the ball-type valve element 22 occupies the position shown in FIGS. 1, 2 and 3. In this position of the valve element 22 the one end of the passageway 53 that opens at the spherical surface of this valve element is open to the chamber 3, and the one end of the passageway 52 that opens at this spherical surface is disposed within the annular valve seat 14, as is apparent from FIG. 1. In this position of the valve element 22 the flow of fluid under pressure from the brake cylinder to atmosphere is unrestricted via the brake cylinder pipe, the brake control valve device which it may be assumed is in its release position, the brake cylinder exhaust pipe, the pipe bracket, chamber 3, passageways 53 and 52 in the valve element 22, chamber 21 and thence past the rubber shield 18 which is defected away from the cylindrical inner surface 16 on exhaust valve member 11 whenever the pressure in the chamber 21 exceeds atmospheric pressure. It will be apparent that, when the fluid under pressure thus discharged from the brake cylinder device and chamber 21 is reduced to substantially atmospheric pressure, the shield 18 will return to the position shown in FIGS. 2 and 3.

From the foregoing, it is apparent that, when a brake release is effected while the handle 40 occupies its direct exhaust position shown in FIGS. 2 and 3, no fluid under pressure is retained in the brake cylinder device.

If it is desired to release fluid under pressure from the brake cylinder device at a slow rate until the pressure therein is reduced to a chosen pressure such as, for example, 20 pounds per square inch, and thereafter retain this pressure in the brake cylinder device when a recharge of the brake equipment is effected while the train is descending a grade, prior to beginning the descent, the train will be stopped and a trainman, assuming each car in the train to be provided with the pressure retaining valve device 1, will manually rotate the handle 40 of each valve device 1 clockwise through an angle of 60° from its first position shown in FIGS. 2 and 3 to a second position.

As the handle 40 is rotated as described above, it is effective to rotate the ball-type valve element 22 therewith from its first position shown in FIGS. 1, 2 and 3 in which the V-shaped bend 27 in spring 28 is disposed in the detent 24 at one end of the groove 23 in the valve element 22 to its second position shown in FIG. 4 in which the V-shaped bend 27 is disposed in the detent 26 intermediate the ends of the groove 23, it being understood that the spring 28 serves to prevent movement of the valve element 22 from any one of its three positions by vibration encountered by a railway vehicle while traveling along a track.

In this second position of the ball-type valve element 22 shown in FIG. 4, that end of the drilled passageway 49 that opens at the spherical surface of this valve element 22 is disposed within the annular valve seat 14. Now when the brake control valve device is moved to its release position in response to an increase in pressure in the usual train pipe, fluid under pressure will flow from the brake cylinder device to the chamber 3 in the casing 2 in the manner hereinbefore described. Since the valve element 22 now occupies the position shown in FIG. 4, the fluid under pressure supplied to the chamber 3 flows to the left-hand side of the cup-shaped check valve 45 (as viewed in FIG. 2) via the left-hand end of counterbore 44 and acts on the area of this valve within the O-ring 46 which constitutes an annular valve seat. When the pressure acting on the area of the valve 45 within the annular valve seat 46 has been increased to a chosen pressure such as, for example, 20 pounds per square inch, valve 45 will be moved in the direction of the right hand, as viewed in FIG. 2, away from the valve seat or O-ring 46 against the yielding resistance of the spring 48.

Subsequent to the unseating of the valve 45 in the manner just explained, fluid under pressure supplied from the brake cylinder device to the chamber 3 will flow past the unseated valve 45 and thence to atmosphere via counterbore 44 (FIG. 2), drilled passageway 49 (FIG. 4) which constitutes a choke, exhaust valve chamber 21 (FIGS. 2 and 3) and past the rubber shield 18 at a slow or restricted rate determined by the size of the choke 49 until the pressure in the brake cylinder device is reduced to the aforementioned 20 pounds per square inch at which time the spring 48 seats the valve 45 on its seat 46 to prevent a further reduction in pressure in the brake cylinder device. Thus, a chosen pressure of, for example, 20 pounds per square inch, is retained in each brake cylinder device to maintain the brakes applied while the brake equipment is recharged as the train descends a grade.

Let it be supposed that it is desired to effect a complete release of fluid under pressure from the brake cylinder devices on the cars in the train at a slow rate while recharging the brake equipment as the train descends the grade. In this case, the train will be stopped prior to beginning the descent and a trainman will manually rotate the handle 40 of each pressure retaining valve device 1 clockwise from the position it occupies in FIGS. 2 and 3 through an angle of 135° to a third or slow direct position.

As the handle 40 is thus rotated as just described, it is effective to rotate the ball-like valve element 22 from its first position shown in FIGS. 1, 2 and 3 to its third position shown in FIG. 5 in which the V-shaped bend 27 in the leaf-type spring 28 is disposed in the detent 25 in the groove 23 in the valve element 22. This rotation of the valve element 22 is sufficient to move that end of the bore 50 that opens at the spherical surface of this valve element 22 to a position in which it is disposed within the annular valve seat 14.

Fluid under pressure supplied from the brake cylinder to the interior of the chamber 3 in the manner hereinbefore described will now flow to atmosphere via the passageways 52 and 53, counterbore 51, bore 50 which constitutes a choke, exhaust chamber 21 and past the shield 18 at a slow rate determined by the size of the choke 50 until fluid under pressure has been completely released from each respective brake cylinder device.

Having now described the invention, what I claim as new and desire to secure by Letters Patent, is:

1. A brake cylinder pressure retaining valve device comprising a casing having a chamber therein, an inlet port in communication with said chamber via which fluid under pressure from a brake cylinder is admitted to said chamber, and an outlet port via which fluid under pressure is released to atmosphere, wherein the improvement comprises:
   a. a removable exhaust valve seat member disposed in said outlet port and having an annular exhaust valve seat,
   b. a spherical valve element disposed in said chamber and rotatable therein to different rotary positions relative to said exhaust valve seat member, said valve element having a longitudinal stepped bore therein, a plurality of ports of different cross-sectional area certain of which intersect each other and one of which intersects said stepped bore, and a removable annular valve seat carried in said stepped bore, and
   c. a check valve biased into seated relation on said removable annular valve seat, said spherical valve element having one position in which said inlet port communicates with said outlet port via said chamber, a pair of said intersecting ports in said valve element and said exhaust valve seat to release fluid under pressure to atmosphere at a rapid rate, and being rotatable out of said one position to a first different position in which said inlet port communicates with said outlet port via said longitudinal stepped bore, past said check valve, another of said ports and said exhaust valve seat to release fluid under pressure to atmosphere at a restricted rate down to a chosen low pressure determined by the biasing force seating said check valve, and being rotatable out of said first different position to a second different position in which said inlet port communicates with said outlet port via one of said pairs of ports, a forth one of said plurality of ports, and said exhaust valve seat to release fluid under pressure to atmosphere at a restricted rate.

2. A brake cylinder pressure retaining valve device as recited in claim 1, further characterized in that the axis of said inlet port and the axis of rotation of said spherical valve element are coaxial, and the axis of said annular exhaust valve seat and said axis of rotation of said valve element are at substantially a right angle to each other.

3. A brake cylinder pressure retaining valve device, as recited in claim 1, further characterized in that said casing is provided with a securing flange having a face at which said inlet port opens and through which said inlet port extends to the chamber in the casing, and with an annular groove extending inwardly from said face of said securing flange in surrounding relation to said inlet port for receiving a sealing member.

4. A brake cylinder pressure retaining valve device, as recited in claim 1, further characterized in that said exhaust valve seat member comprises:
   a. an annular member provided intermediate its ends with a peripheral annular groove and at one end with a counterbore,
   b. an annular seal member disposed in said groove for forming a seal with the wall surface of said outlet port, and
   c. an annular resilient valve seat removably disposed in said counterbore.

5. A brake cylinder pressure retaining valve device, as recited in claim 4, further characterized by means yieldingly biasing said spherical valve element against said annular resilient valve seat.

6. A brake cylinder pressure retaining valve device, as recited in claim 5, further characterized by means carried by said spherical valve element and cooperating with said biasing means to define the different rotary positions of said valve element.

7. A brake cylinder pressure retaining valve device, as recited in claim 6, further characterized in that said means carried by said spherical valve element comprises a groove formed on the surface thereof, said groove being provided with a plurality of spaced-apart detents therein, and said biasing means comprises a leaf-type spring having intermediate its ends a bend, said spring being so arranged that its ends are anchored in said casing and said bend is disposed in one or another of said detents accordingly as said spherical valve element occupies one or another of its plurality of positions.

8. A brake cylinder pressure retaining valve device, as recited in claim 7, further characterized in that the configuration of said leaf-type spring comprises two legs the intersection of which forms a first V for engagement with one of said detents, and each of said legs is bent to form a V that is reversely arranged with respect to said first V, one leg of each of said second V's constituting one leg of said first V and the other leg of each of said second V's being anchored in said casing.

9. A brake cylinder pressure retaining valve device, as recited in claim 4, further characterized in that each of said ports opens at the spherical surface of said spherical valve element, and the location at which said ports open are so arranged that at least one thereof opens within said annular resilient valve seat in each of said positions of said spherical valve element.

* * * * *